United States Patent [19]
Klimchak et al.

[11] 3,725,928
[45] Apr. 3, 1973

[54] DIGITALLY CONTROLLED WEIGHT ADJUSTMENT SYSTEM

[75] Inventors: Edward George Klimchak, Owings Mills; Erik Rosenbaum, Randallstown, both of Md.

[73] Assignee: The Bendix Corporation, Southfield, Mich.

[22] Filed: Mar. 31, 1971

[21] Appl. No.: 129,728

[52] U.S. Cl. ............................ 343/55 A, 343/5 DP
[51] Int. Cl. ......................................... G01s 9/02
[58] Field of Search ...................... 343/5 DP, 5 SA

[56] References Cited

UNITED STATES PATENTS 3,636,562  1/1972  Wehner ........................... 343/5 SA
3,588,895  9/1969  Goggins, Jr. et al. ............ 343/5 SA

*Primary Examiner*—Malcolm F. Hubler
*Attorney*—Plante, Hartz, Smith & Thompson, Bruce L. Lamb and William G. Christoforo

[57] ABSTRACT

A hyperplane radar signature recognizer consists of a delay line through which a radar signature which is to be classified is propagated. The delay line includes a plurality of time spaced taps at which time spaced points on the radar signature are sampled. Each delay line tap is sampled through an associated electrically controlled weight with the weighted samples being summed to provide a measure of signal classification. The electrically controlled weights are controlled by propagating through the delay line prior to the receipt of the radar signature an amplitude standardized pulse. With all weights disabled so as to present an open circuit to the aforementioned summing network the weights are enabled one at a time in turn, and the output from the summing network compared against a desired weight value. The electrically controlled weight is then adjusted until its value is equal to the desired value. After all the electrically controlled weights have been set to their desired values the signature recognizer is ready to receive the radar signature. The timing logic circuit required to program the adjustment of the electrically controlled weights is also disclosed.

11 Claims, 2 Drawing Figures

INVENTORS

ERIK ROSENBAUM
EDWARD G. KLIMCHAK

DIGITALLY CONTROLLED WEIGHT ADJUSTMENT SYSTEM

BACKGROUND OF THE INVENTION

This invention relates to pattern recognizers and more particularly to pattern recognizers for classifying radar signatures. This invention has particular application to hyperplane radar signature recognizers and particularly to those recognizers which operate in real time.

The currently evolving discipline of pattern recognition, in the case of radar signal returns, is concerned with analyzing the radar return, which herein is termed the radar signature, to determine whether the signature belongs to a certain class of signals. As an example, a pattern recognizer might be required to determine whether the return is from an aircraft as opposed to the return from a missile or other possible types of targets. It is known that the radar signature of an aircraft will differ from the radar signature of other possible targets. It is also known that in spite of the differing radar signatures of various aircraft angle of attack, certain techniques are available to the skilled practitioner in the pattern recognition art which allow a signature to be analyzed and a value assigned to the signature which is a measure of the certainty that the signature belongs to the desired class, in this case, that class of radar signatures characteristic of radar returns from an aircraft.

Briefly, the signature is analyzed by processing methods which include weighing predetermined time spaced points or samples on the signature and combining the results of this weighing to obtain a measure of recognition. The weights are adjusted, almost invariably, through the use of computers and known hyperplane teaching algorithms, so that the recognition measurements for the radar signatures of various aircraft will plot in one section of hyperplane space and the radar signatures of possible targets which are not aircraft will plot in another section of hyperplane space.

Pattern recognition as described above has been performed by computer. The computer determines during its learning period, at which time it is presented with radar signatures from targets typical of those which it is to subsequently recognize, the value of weights to be used in the recognition process. The weights are applied to the predetermined portions of a radar signature to be recognized, almost invariably by attaching proper weights in the form of proper valued resistances to taps on a delay line and by allowing the radar return to propagate through the delay line. The weighted samples are combined in a summing network with the weighted sum being a measure of signature classification.

SUMMARY OF THE INVENTION

It is an object of this invention to provide a weighing network for use with a pattern recognizer.

It is another object of this invention to provide a weighing network for a pattern recognizer wherein the weight can be easily and quickly set to its desired value.

It is one more object of this invention to provide an electrically controlled resistance which is self-calibrating.

It is still another object of this invention to provide a pattern recognizer which uses self-calibrating weights.

It is still a further object of this invention to provide logic circuitry for setting the value of weights in a pattern recognizer of the type described.

These, and other objects of the invention are accomplished by providing a field effect transistor whose source to drain circuit functions as a variable resistor by adjusting the voltage at the gate electrode. A capacitor is connectable, through a switching transistor, between the gate electrode and ground, with the switching transistor being additionally effective to remove the ground and to substitute therefore a different constant voltage. With one side of the capacitor grounded through the switching transistor charges are added to the capacitor to set the gate voltage and hence, vary the value of the electrical resistance. When the switching transistor is switched so that the second voltage is applied in place of the ground, the voltage at the gate electrode is changed to a pinch-off voltage, to thus make the electrical resistance effectively infinite, without destroying the charge across the capacitor. In other words, with the field effect transistor disabled by a pinch-off voltage at its gate electrode the electrical path through the FET source-drain circuit is effectively open.

When ground is once more restored by means of the switching transistor the electrical resistance will return to its original set value.

The pattern recognizer is made up of a delay line including a plurality of spaced taps. Each delay line tap is connected into a summing network through a tap associated electrically controlled weight of the type described above. The individual weights are set to their proper value quickly and easily by a servo loop wherein the electrical weight is compared to the proper value of electrical weight with any resulting error signal being used to adjust the electrical weight. This is accomplished by initially disabling all of the weights so that an open circuit is presented between the delay line taps and the summing network. A pulse standardized as to amplitude is propagated through the delay line while the weights are energized one at a time by logic circuitry controlled by a master clock. There is also provided a memory into which the proper values of the individual weights have been stored. This memory is caused to discharge its contents in accordance with signals received from the master clock in synchronism with the energizing of the individual weights. Thus, as a particular weight is energized its desired value is caused to be extracted from the memory. The value of the controlled weight is compared against the desired value as extracted from the memory with any resultant error signal being used to adjust the value of the controlled weight. After all the controlled weights have been set to their desired values they are all energized and the pattern recognizer is ready to receive a radar signature input.

BRIEF DESCRIPTION OF THE DRAWINGS

FIG. 2 is a block diagram of an embodiment of the invention including the pattern recognizer and the logic circuitry required to set the controlled weights thereof.

DESCRIPTION OF THE PREFERRED EMBODIMENT

Figure 1:
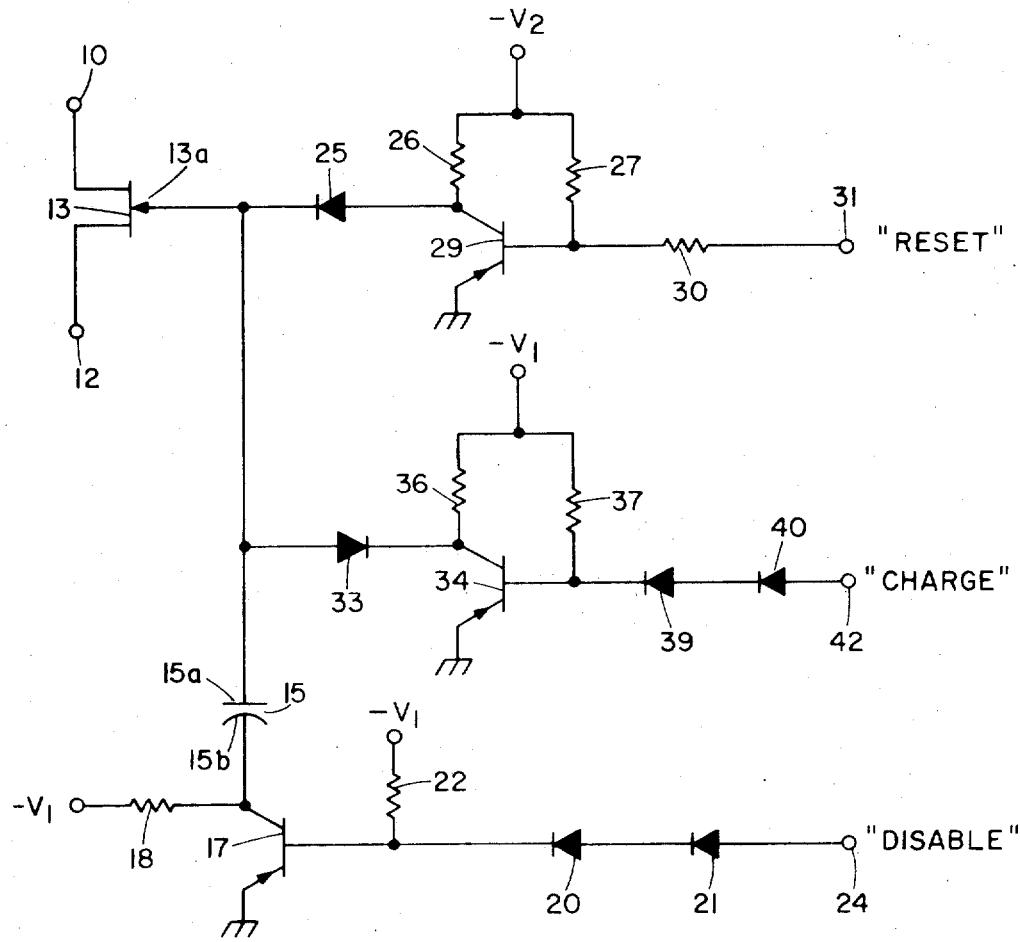
FIG. 1 is a schematic of an electrically controlled weight which is adapted for use with this invention.

Referring to the figures wherein like numerals refer to like elements and more particularly by first referring to FIG. 1 there is seen a field effect transistor (FET) 13 having a source-drain circuit connected between terminals 10 and 12. The resistance across terminals 10 and 12, through the source-drain circuit, is dependent, as well known, upon the voltage at gate electrode 13a. The gate electrode is connected to one plate 15a of memory 15 whose other plate 15b is connected to the collector electrode PNP transistor 17, which collector electrode is also connected to a source of negative voltage $-V_1$ (not shown) through resistor 18. The emitter of transistor 17 is grounded while the transistor base is connected through resistor 22 to the $-V_1$ voltage source and additionally to diodes 20 and 21 to "disable" terminal 24. Gate electrode 13a is also connected through diode 25 to the collector electrode of PNP transistor 29, whose emitter electrode is grounded. The collector electrode and base electrode of this transistor are connected to a second source of negative voltage $-V_2$ (not shown), respectively, through resistors 26 and 27. The base electrode of transistor 29 is also connected through resistor 30 to "reset" terminal 31. Gate electrode 13a is also connected through diode 33 to the collector electrode of PNP transistor 34, whose emitter electrode is grounded and whose collector and base electrodes are respectively connected through resistors 36 and 37 to the $-V_1$ voltage source. The base electrode of transistor 34 is also connected through diodes 39 and 40 to a "charge" terminal 42. For the embodiment shown voltage level $-V_2$ is substantially more negative than voltage level $-V_1$.

In normal operation of the circuit of FIG. 1, transistors 17 and 34 are saturated so that their collector electrodes are grounded, and transistor 29 is cut-off so that its collector electrode is at the $-V_2$ voltage level. In this condition both diodes 25 and 33 are back-biased and the voltage on capacitor plate 15a resulting from the charge thereof is applied directly to gate electrode 13a. Since gate electrode 13a has an inherently high input impedance the charge on plate 15a cannot bleed off and the capacitor will thus function as a memory for charges stored thereon. This voltage on gate 13a, of course, determines the resistance between terminals 10 and 12.

The resistance between terminals 10 and 12 can now be made almost infinite, that is, field effect transistor 13 can be pinched-off by applying a positive signal to "disable" terminal 24, which is thus applied through diodes 20 and 21, which in this case operate merely as solid state impedance elements, to the base electrode of transistor 17. This transistor thus cuts off and the collector electrode thereof drops to the $-V_1$ voltage level. Since plate 15b of capacitor 15 is connected to this collector electrode its voltage also drops to the $-V_1$ voltage level. Simultaneously, of course, the voltage at plate 15a drops by the same amount as plate 15b while the voltage impressed across the capacitor remains constant. The voltage at plate 15a at this time is designed to be at least the pinch-off voltage of FET 13, thus causing the resistance between terminals 10 and 12 to become practically infinite. Upon removal of the positive signal at "disable" terminal 24, the collector electrode of transistor 17 is once more grounded causing the voltage at capacitor plate 15a and hence at gate electrode 13a to be restored to its original value.

The charge on plate 15a can be drained by applying a relatively negative voltage signal to "reset" terminal 31, which is thus applied by resistor 30 to the base electrode of transistor 29 thereby saturating that transistor. This effectively grounds the collector electrode of transistor 29 to thus discharge plate 15a of capacitor 15.

Capacitor 15 can subsequently be recharged by applying a positive voltage signal at "charge terminal" 42 which is thus applied through resistor diodes 39 and 40 to the base electrode of transistor 34 to thus disable that transistor. This removes the ground from the collector electrode of that transistor and allows plate 15a to accumulate charges from the $-V_1$ voltage source through resistor 36 and diode 33. In this manner capacitor 15 may charge to a voltage equal to the entire $-V_1$ voltage source less, of course, the negligible voltage drop across diode 33.

Figure 2:
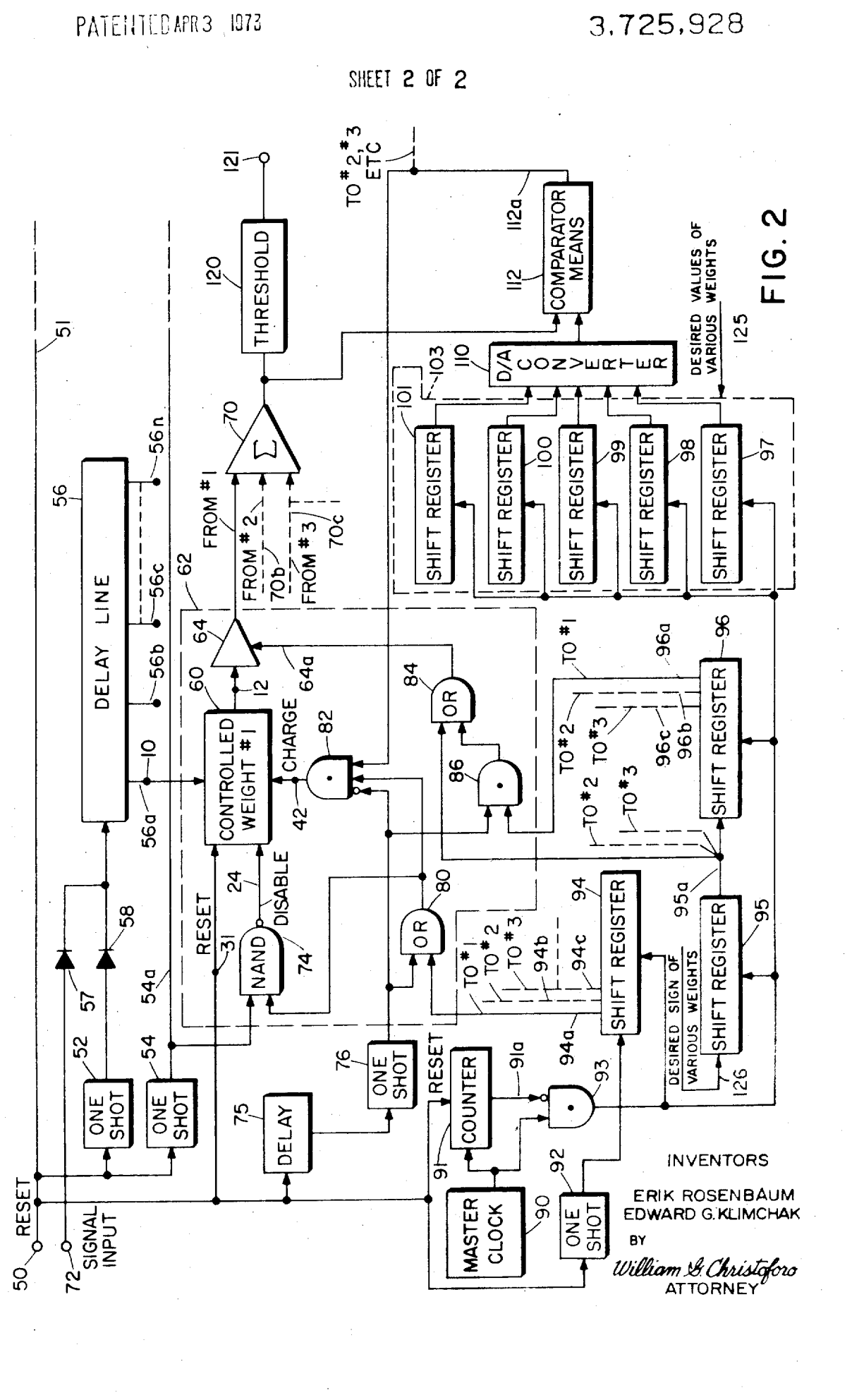

Referring now to FIG. 2 there is seen a radar signature recognizer which uses the electrically controlled weights of FIG. 1. In FIG. 2 there is seen the aforementioned delay line 56 which includes a plurality of spaced delay line output taps for example taps 56a, 56b, 56c and 56n. For clarity, only a single controlled weight 60, designated controlled weight No. 1 is shown. Terminal 10 of the controlled weight is shown connected to output tap 56a. Controlled weight 60 has characteristics of the electrical weight shown in FIG. 1. It should be understood that similar controlled weights are provided, one for each delay line output tap, for example, a controlled weight No. 2 for tap 56b, controlled weight No. 3 for tap 56c, etc. How these further controlled weights are integrated into the circuit of this figure will be made obvious as the description proceeds.

Generally, the elements contained within the dashed box 62 comprise the various steering gates required to adjust the value of weight 60. A set of these elements is associated with each controlled weight, so that a plurality of items 62 are provided in the signature recognizer, one for each delay line output tap utilized.

As previously described, controlled weight 60 presents a controlled resistance between terminals 10 and 12, the first of said terminals being connected to delay output tap 56a and the second of these terminals being connected as an input to unity amplifier 64. This last mentioned amplifier has the characteristic ability to pass a signal therethrough with unity gain in the absence of a signal at input line 64a or, on the other hand, to invert a signal passing therethrough when a signal is applied at 64a. The output from amplifier 64 is then applied as one input to summing network 70. Summing network 70 also receives as inputs the output signal from corresponding unity amplifiers associated with the other, but not shown, controlled weights. For example, input 70b is from the unity amplifier 64 associated with controlled weight No. 2 and the input 70c is from the unity amplifier 64 associated with controlled weight No. 3.

Each controlled weight 60 also includes "reset" terminal 31 which is connected via a line 51 to a system reset terminal 50. System reset terminal 50 is also connected to the inputs of one-shots 52 and 54. The output of oneishot 52 is applied through diode 58 to the input of delay line 56. A signal input terminal 72 is connected to receive the radar signature to be identified from a source, not shown, to be applied through diode 57, also to the input of delay line 56. The signal output from one-shot 54 is applied to a Nand gate 74 whose output is applied to the "disable" terminal 24 of the controlled weight. The output of one-shot 54 is also applied to similar Nand gates associated with the other controlled weights via line 54a.

System reset terminal 50 is also connected to the input of the signal delay 75 which has a delay period equal to the entire time required to adjust all the controlled weights. At the completion of this delay time, that is after all the control weights have been set, one-shot 76 is triggered. The output pulse from this one-shot is applied through Or gate 80 as an input to Nand gate 74 and further as an input to And gate 82. The one-shot 76 output pulse is also applied as input to And gate 86. The output signal from this latter gate is applied through Or gate 84 to terminal 64a of unity amplifier 64.

System reset terminal 50 is also connected to the input of one-shot 92 whose output pulse is entered into shift register 94, and to the reset terminal of counter 91.

A master clock 90 generates clock pulses which are applied via And gate 93 to shift registers 94 through 101. The clock pulses are also applied to and accumulated by counter 91. Shift registers 97 through 101 comprise a memory 103 in which is stored digital information related to the desired values of the various controlled weights. The outputs of these shift registers are applied to a D/A converter 110 where the digital information is converted to an analog signal which is applied to a comparator 112 together with the output from summing network 70. An error signal generated by comparator 112 will be applied via line 112a as an input to gate 82, whose output is applied to the "charge" terminal 42 of the controlled weight 60. In addition, line 112a is connected to the input of similar And gates 82 associated with the other controlled weights. Shift register 95 contains information as to whether a particular weight should be positive or negative.

Information may be stored into the shift registers in a number of different ways. The information may be transferred from punched cards or tape or even manually. In more sophisticated applications the information can be transferred from a computer as it is continually being updated during the time the signature recognizer is being used. An understanding of the exact means used to enter the proper information into the shift registers is not necessary to an understanding of the invention. In addition, means for entering information into shift registers is known to those skilled in the art and need not be presented here. In any event, information indicative of the absolute value of the weights is supplied to memory 103 from one of the aforementioned means (not shown), as represented by arrow 125, while information indicative of the sign of the weights, either positive or negative, is entered into shift register 95, as represented by arrow 126, usually from the same means.

OPERATION

Assuming that the information required to adjust the controlled weights is already entered into the shift registers 95 through 101, the cycle of adjusting the controlled weights is started by applying a system reset pulse at reset terminal 50. This pulse is applied via line 51 to the various "reset" terminals 31 of the controlled weights. It will be remembered that applying a pulse to "reset" terminal 31 discharges the capacitor in the controlled weight thus erasing the weight's memory. The reset pulse is also applied to delay 75 to start that element's timing period. It is also applied to trigger one-shots 52, 54 and 92. The output pulse from one-shot 52 is applied through diode 58 to delay line 56, thus causing a standardized amplitude pulse to propagate through the delay line so that the standardized output appears at the various delay line output taps. The output pulse of one-shot 54 is applied to Nand gate 75 associated with the first controlled weight and through line 54a to the other Nand gates 74 associated with the other controlled weights. The output pulse from one-shot 54 is relatively long, being at least a period equal to the time required to set all of the controlled weights plus the expected time required for the receipt and processing of a radar signature. The system reset pulse is also applied to reset the counter 91 which counts the clock pulses from master clock 90. The counter, when filled, applies an inhibiting signal along line 91a to inhibit and maintain gate 93 closed. However, now with counter 71 reset the inhibiting signal on line 91a is extinguished and the clock pulses pass through gate 93 to shift registers 94 through 101. The output pulse from one-shot 92 is clocked into shift register 94 and appears at line 94a, which samples the first stage of shift register 94. Line 94a is connected through Or gate 80 to And gate 82. This latter And gate is thus qualified. Simultaneously the first information bit in each shift register 97 to 101 is strobed into D/A converter 110. These five bits comprise the information as to the desired value of controlled weight No. 1. The analog equivalent of this signal is generated by converter 110 and applied to comparator 112.

It will also be noted that the output from Or gate 80 is applied to Nand gate 74 which already has its other input energized from one-shot 54. Accordingly, Nand gate 74 which ordinarily applies a positive signal at "-disable" terminal 24 to thereby disable the controlled weight now applies a negative signal at that terminal to enable that weight. Of course, while this controlled weight is enabled during the weight adjustment period, all other controlled weights are disabled.

The clock pulses to shift registers 95 and 96 cause the information contained in the first shift register to transfer via line 95a to the second shift register. Additionally, the information as it is transferred from one shift register to the other is sampled and applied simultaneously to each of the Or gates 84 associated with the various controlled weights. This information passes through Or gate 84 and is applied via line 64a to each of the unity amplifiers 64. Since, at the time the first clock pulse is generated after the system reset pulse, there is presented at comparator 112 an analog signal corresponding to the desired value of controlled weight No. 1 and there is at that time also presented on line 95a information as to whether the weight should be positive or negative and that further during this first clock pulse only controlled weight No. 1 is enabled, all other controlled weights being disabled, it is immaterial that the information being applied simultaneously to all unity amplifiers 64 is information related only to the first controlled weight since the other controlled weights being disabled there is no input to their associated unity amplifier so that only the unity amplifier 64 associated with controlled weight No. 1 applies an input at this time to the summing network 70. Thus, at this time summing network 70 operates merely as an electrical conduit to apply the output from unity amplifier 64 to comparator 112 wherein the present value of controlled weight No. 1 is compared against its desired value. Any difference results in an error signal being generated by the comparator which is applied via line 112a to the gate 82 associated with each of the controlled weights. However, since only that gate 82 associated with controlled weight No. 1 is now open the error signal is applied only to controlled weight No. 1 and operates to adjust this weight to its desired value.

Upon the occurrence of the second clock pulse after the system reset pulse output line 94b of shift register 94 is energized and all other output lines thereof are deenergized. Accordingly, controlled weight No. 1 is disabled and controlled weight No. 2 becomes enabled. Additionally, the second clock pulse shifts another bit of information from shift register 95 to shift register 96 which bit is also sampled during the transfer to apply the proper polarity signal to the unity amplifier 64 associated with controlled weight No. 2. At the same time the second clock pulse strobes shift registers 97 to 101 so that the second information bit of each is applied to D/A converter 110 and an analog signal corresponding to the desired value of the second controlled weight is now presented at comparator 112.

The final adjusting of controlled weight No. 2 and of the further controlled weights should now be obvious. It should also be obvious at this time that shift registers 94 through 101 will each have the number of stages equal to the number of controlled weights to be adjusted. Additionally, counter 91 will fill on a count equal to the number of controlled weights to be adjusted. Therefore, at the completion of the adjustment period counter 91 will be filled and will apply an inhibiting signal along line 91a to close gate 93 so that clock pulses are no longer applied to the shift registers. At this time the information related the desired sign of the controlled weights will have been shifted from shift register 95 into shift register 96.

Remember that delay 75, which is suitably a one-shot or other standard pulse delay, delayed the system reset pulse for a time at least equal the time required to adjust all the controlled weights. Therefore, after counter 91 has been filled and gate 93 closed, delay 75 generates an output which triggers one-shot 76. The period of this latter one-shot will at least encompass the time required to receive and classify a radar signature. The one-shot output pulse is applied directly to an inhibit terminal on each gate 82 associated with each controlled weight to thereby inhibit those gates so that the controlled weights will not be further adjusted. The one-shot output pulse is also applied through each Or gate 80 to Nand gate 74 so that each controlled weight at this time is enabled. It will also be noted that at this time shift register 96 contains the information originally stored in shift register 95 and now presents this information in parallel by bit format with the information as to the sign of controlled weight No. 1 appearing on shift register output line 96a, the information related to the sign of controlled weight No. 2 being presented on shift register output 96b, etc. This information is applied to the unity amplifier associated with controlled weight No. 1 by the connection of output line 96a through gate 86, which is now qualified by the one-shot 76 output pulse, and through gate 84 to the unity amplifier 64 associated with controlled weight No. 1. In like manner the other shift register output lines are connected through similar gates to the associated unity amplifiers of the other controlled weights. The recognizer is now ready to classify an incoming radar signature. This signature will be applied at signal input terminal 72 from a source not shown. This radar signature can be applied from a radar receiver or possibly from a memory in which has been stored the radar signatures. The radar signature is applied from terminal 72 and through diode 57 to the input of delay line 56 through which it is propagated. The signature is sampled at the various delay line output taps through the associated controlled weights, with the weighted samples being either inverted or applied directly to summer 70. If the output of summer 70 exceeds a preset threshold as determined by threshold 120 an output signal identifying the signature appears at terminal 121.

In the actual use of a radar signature recognizer of the type herein described a timing device was provided to apply the system reset pulse to terminal 50. Thereafter the timing device triggers a radar transmitter. The return from a resulting transmission is applied to signal input 72 and classified by the radar signature recognizer comprised of the delay line, controlled weights, summer and threshold. The time between the generation of the system reset pulse and the triggering of the radar transmitter is designed to be sufficient to allow each of the controlled weights of the signature recognizer to be adjusted.

The invention claimed is:

1. In a radar signature recognizer which includes: a delay line having a plurality of output taps; a summing network having an output terminal; a plurality of controlled weights, one associated with each said output tap, each said controlled weight being connected between its associated output tap and said summing network; an improvement consisting of means for adjusting said controlled weights comprising:

first means for storing in predetermined order the desired value of each of said controlled weight;

second means for propagating a standardized amplitude signal through said delay line;

third means for activating said controlled weights in a predetermined sequence, one at a time;

fourth means comparing the resultant signals at said summing network output terminal with the desired value of the activated controlled weight for generating an error signal; and, fifth means responsive to said error signal for adjusting the activated controlled weight.

2. The improvement of claim 1 wherein said fourth means includes clock means for synchronizing the operation of said fourth means with said first, second, third and fifth means.

3. The improvement of claim 2 wherein said first means comprises shift register means for storing in digital form information related to the desired value of each said controlled weight, said shift register means being responsive to said clock means for strobing said desired values from said shift register means in said predetermined order synchronously with operation of said third means.

4. The improvement of claim 3 with additionally a plurality of means responsive to information strobed from said shift register means for inverting or non-inverting a signal passing therethrough, one of said latter means being connected between each said controlled weight and said summing network.

5. The improvement of claim 1 wherein said plurality of controlled weights comprise a plurality of adjustable electrical resistances.

6. The improvement of claim 1 wherein each of said plurality of controlled weights comprises:
 a field effect transistor having a source-drain circuit connected between the controlled weight associated delay line output tap and said summing network, and a gate electrode;
 a capacitor having a first plate connected to said gate electrode and a second plate; and
 switching means responsive to said third means for selectively applying first and second voltages on said second plate.

7. In a radar signature recognizer which includes: means for delaying a signal propagated therethrough including a plurality of time spaced output taps; means for summing electrical signals applied thereto and including an output terminal upon which first signals related to the sum of said electrical signals is generated; and a plurality of adjustable resistance means, one associated with each said output tap, connected between its associated output tap and said means for summing; an improvement consisting of means for adjusting said resistance means comprising:
 a source of clock pulses;
 first means for propagating an amplitude standardized signal through said means for delaying;
 second means responsive to said clock pulses for generating in predetermined order information related to the desired value of each said resistance means;
 third means responsive to said clock pulses for activating said resistance means in a predetermined sequence one at a time synchronously with the generation of information related to the desired value of the activated resistance means; and,
 fourth means comparing said first signals with said information for generating an error signal, the activated resistance means being responsive to said error signal.

8. The improvement of claim 7 wherein said second means comprises a shift register means for storing in binary format the desired value of each said resistance means, said shift register means being responsive to said clock pulses for generating said desired values in said predetermined order.

9. The improvement of claim 7 wherein each said resistance means includes:
 a field effect transistor having a source-drain circuit connected between its associated output tap and said means for summing, and a gate electrode;
 a capacitor having a first plate connected to said gate electrode and a second plate;
 switching means for selectively applying first and second voltages to said second plate; and,
 means responsive to said error signal for adjusting the voltage stored across said capacitor.

10. The improvement recited in claim 9 wherein said means responsive to said error signal comprises:
 means responsive to said clock pulses for discharging the capacitors of all said resistance means; and,
 means responsive to said error signal for subsequently increasing the voltage stored across said capacitor.

11. The improvement of claim 7 wherein each said resistance means includes:
 an adjustable resistance having one end connected to its associated output tap and a second end; and
 an inverting and non-inverting amplifier responsive to said information, said amplifier being connected between said adjustable resistance second end and said means for summing.

* * * * *